Sept. 15, 1953 P. N. SORENSEN 2,652,474
METHOD OF HEATING OPPOSED EDGES OF ELONGATED MEMBERS
Filed Nov. 24, 1952 2 Sheets-Sheet 1
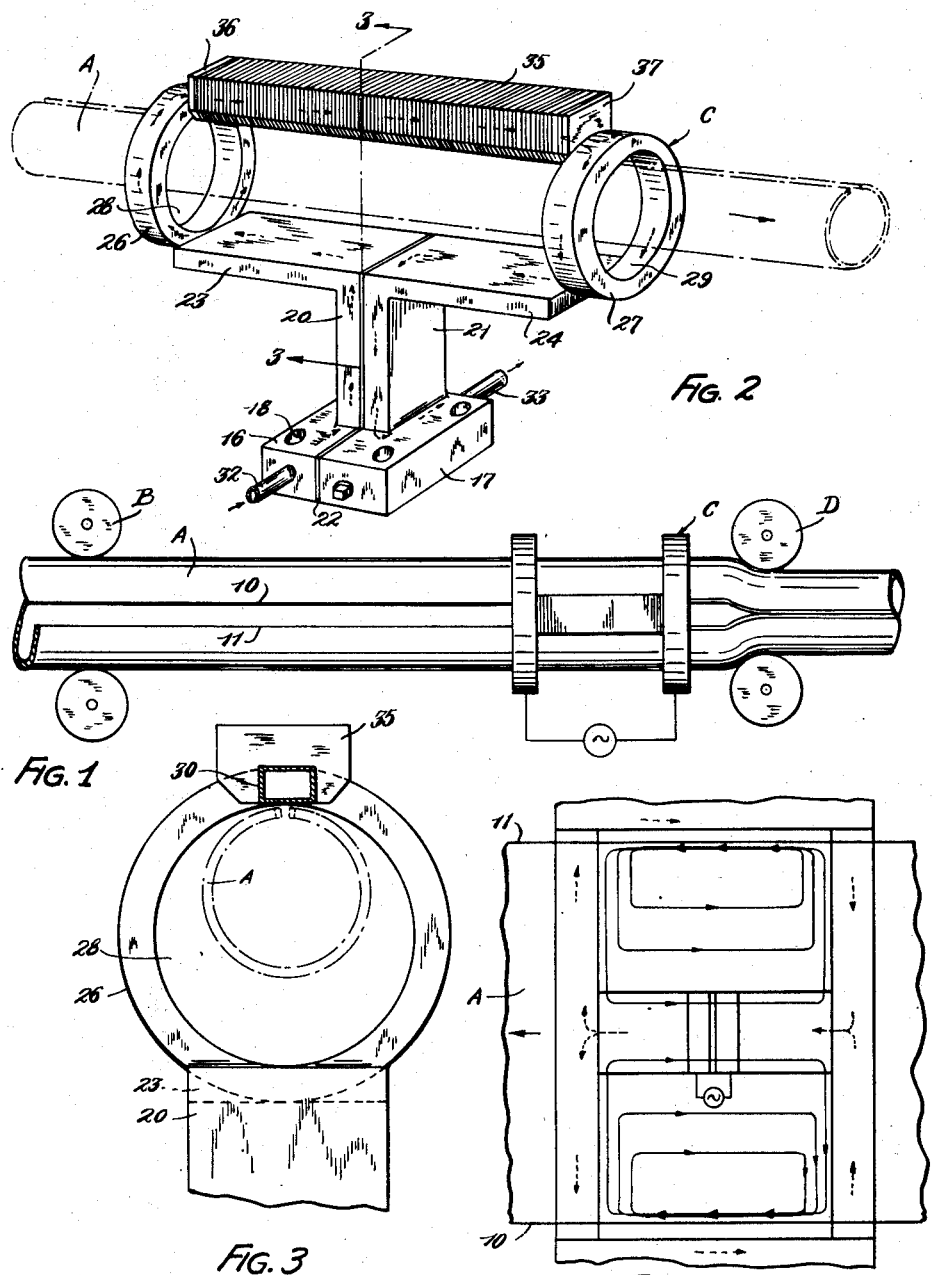
INVENTOR.
PHILLIPS N. SORENSEN
BY
ATTORNEY Sept. 15, 1953  P. N. SORENSEN  2,652,474
METHOD OF HEATING OPPOSED EDGES OF ELONGATED MEMBERS
Filed Nov. 24, 1952  2 Sheets-Sheet 2

INVENTOR.
PHILLIPS N. SORENSEN
BY
*Alfred W. Body*
ATTORNEY

Patented Sept. 15, 1953

2,652,474

UNITED STATES PATENT OFFICE 2,652,474

METHOD OF HEATING OPPOSED EDGES OF ELONGATED MEMBERS

Phillips Nielsen Sorensen, Cleveland, Ohio, assignor to The Ohio Crankshaft Company, Cleveland, Ohio, a corporation of Ohio Application November 24, 1952, Serial No. 322,179

16 Claims. (Cl. 219—10)

This invention pertains to the art of high-frequency induction heating and, more particularly, to method and apparatus for heating selected elongated portions of generally cylindrical members such as, but not limited to, the opposed edges of skelp before welding the edges thereof into a tube.

This application is a continuation in part of my copending application Serial No. 205,730, now abandoned, filed January 11, 1951, which, in turn, is a division of my copending application Serial No. 58,228 filed November 4, 1948, now Patent No. 2,632,840 dated March 24, 1953, and a continuation in part of my copending application Serial No. 86,066, now abandoned, filed April 7, 1949.

The present invention is applicable to many fields wherein narrow elongated portions of metallic articles must be rapidly and selectively heated. It is particularly adaptable to heating the opposed edges of skelp before the butt welding of same and will be described as applied to such an operation. It should be appreciated that the invention can also be used for selectively heating the welded section for the purposes of annealing or drawing the welded section subsequent to the welding operation.

In the past, many, many methods have been proposed for heating continuously the opposed edges of continuously moving skelp to bring these edges up to the welding temperature so that a weld may subsequently be effected having a strength comparable to that of the portions of the skelp remote from the strip. One method which has been proposed is the use of radiant or flame-type heating. With such methods, the rate of heating is relatively slow requiring either extremely long furnaces, or a relatively slow movement of the skelp through the furnace. In addition, the gases from the flames produce scale on the heated edges which, subsequently, interferes with the making of a perfect weld. Such types of heating are relatively inefficient as large amounts of heat are carried away with the gases of combination.

Heating the edges by electrical means has also been proposed, which welds are primarily electric resistance-type welds wherein the heat is produced by electric currents being passed between abutted edges of the metal and as the resistance of the abutted edges is higher than the solid portions of the metal, the heat produced at the edges is sufficient to weld. The electric voltages across these edges to produce the heating currents have been introduced into the skelp in a number of ways: one by the use of pressure rolls bearing against the skelp adjacent the edges or, secondly, by using the skelp as a single secondary turn of a transformer.

With such types of electric welding, arcing across the abutting joints with the resultant pitting and scale formation results in imperfect welds. Also, as the edges of the skelp may not be exactly uniform or as there may be dirt or the like thereon, unevenness of heating results, with overheating in some places and underheating in others. Also, usually the size of the bead or flash formed is excessive and difficult to control.

Inducing high-frequency electric currents longitudinally along the edges has also been proposed. Heretofore, however, the edges have had electric currents induced therein which flow in opposite directions thereat simultaneously. Thus, there is a point of no currents centrally of the edge which must be heated by conduction. Additionally, such methods require the presence of an inductor internally of the skelp which, from a practical consideration, in many cases, becomes difficult. The electrical coupling of the inductor to the skelp is also relatively poor.

The present invention contemplates a method for uniformly and rapidly bringing the edges of skelp to the welding temperature or for heating selected strips of bodies, which avoids the difficulties existent heretofore and which enables an improved and homogeneous weld to be obtained.

An object of the invention is the provision of a new and improved method for concentrating heating currents in the adjacent edges of skelp prior to butt welding.

Another object is the provision of a new and improved method for electrically heating opposed edges of skelp prior to butt welding wherein no voltage difference will exist between the edges and the detrimental effects of arcing and pitting are avoided.

Another object of the invention is a new and improved method of heating opposed edges of skelp electrically without electrical contact with the skelp and without voltage differential between the edges.

Another object of the invention is to produce localized electric heating in sheets of metal wherein all the currents flow in a common plane, the heating currents being all unidirectional at any one instant of time and concentrated in a narrow path and the return currents being spread out over a considerable portion of the sheet remote from the heated edge.

Another object is to have all the heating currents in the edge to be heated flow in the same direction at any one instant.

Another object of the invention is the provision of a new and improved method of high-frequency induction heating capable of heating opposed edges of skelp in a minimum of time and without producing a voltage differential between the edges.

Another object of the invention is the provision of a method of high-frequency induction heating capable of rapidly heating opposed edges of skelp prior to butt welding.

Still another object of the invention is the provision of a method of heating and welding the edges of skelp comprising passing the skelp through an inductor, inducing concentrated high-frequency currents to flow in the opposed edges of the skelp with the return path therefor being spread out through the remainder of the skelp and bringing the heated edges into pressure-welding engagement.

Another object of the invention is a method of heating the edges of plate-like members comprising inducing high-frequency currents to flow in the plane of the plate, the currents transversely through the plate being all in the same direction and the currents adjacent an edge of the plate being concentrated and remote from the edge, being more widely distributed.

Still another object of the invention is the provision of an arrangement of high-frequency inductors for heating the opposed, close-spaced edges of skelp into the tube or pipe whereby relatively thick sections of metal may be uniformly and rapidly heated.

Generally speaking, the method of the invention comprises inducing high-frequency electric currents to flow all in the same plane of the skelp, the currents flowing in one direction being concentrated at the edges of the skelp and the currents flowing in the opposite direction being distributed rather widely over the remainder of the skelp, the currents transversely through the skelp at any one point all flowing in the same direction.

Also, generally speaking, when the edges to be heated have a substantial thickness, the invention contemplates the use of a pair of parallel conductors disposed on opposite sides of the plate in close-spaced parallel relationship with the edges and so electrically energized that the currents at any one instant in the conductors are in the same direction.

The invention is embodied in certain methods and steps and certain parts and arrangement of parts, preferred embodiments of which are described in the specification and shown in the accompanying drawing which is a part hereof, and wherein:

Figure 1 shows a schematic view of apparatus embodying the present invention comprising skelp passing through a high-frequency inductor to have its opposed edges heated and thence through a pair of pressure rolls to weld the edges;

Figure 2 is an enlarged view of the inductor of Figure 1 embodying the present invention;

Figure 3 is a partial sectional view of Figure 2 on the line 3—3;

Figure 4 is a developed view of the skelp and inductor showing a distribution of the currents induced in the skelp relative to its edges and the inductor;

Figure 5:
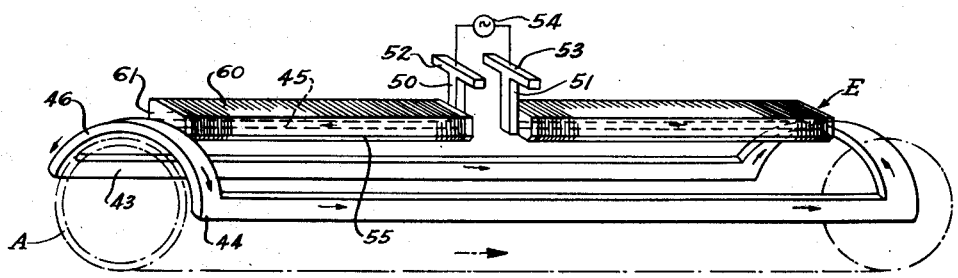
Figure 5 is a side elevational view of a high-frequency electric induction-heating coil embodying the present invention in operative or heating relationship with a continuous length of skelp.

Referring now to the drawings wherein a preferred embodiment of the invention is shown for the purposes of illustration only, Figure 1 shows a skelp A being moved from a pair of driving and forming rolls B, through a high-frequency inductor C and thence through a pair of pressure rolls D. The skelp A shown is illustrative only and may be circular, elliptical or polygonal in cross-sectional shape and has a pair of spaced opposed edges 10 and 11. These edges 10 and 11 are to be heated to the welding temperature (in the region of 2400 degrees for normal carbon steels) and subsequently brought into pressure engagement, whereby a weld will be effected.

The driving and forming rolls B and welding rolls D comprise portions of a much more complex machine and are shown schematically. They may take any desired conventional form including suitable driving motors. Preferably, their speed of rotation is adjustable so that the speed of moving the skelp A through the high-frequency inductor C may be readily controlled. The primary function of the rolls D is to bring the edges 10, 11 into pressure engagement after the edges have been heated by passing through the inductor C. Preferably, some means of adjusting the distance between the rolls D and, thus, the pressure on the heated edges should be provided.

The high-frequency inductor C is shown in greater detail in Figures 2 and 3. Referring to Figure 2, the inductor C comprises a pair of terminal blocks 16, 17 which are adapted to be mounted on the terminal board of a suitable transformer by stud bolts (not shown) extending through stud holes 18. Extending upwardly from the terminal blocks 16, 17 are a pair of conductors 20, 21 which are preferably rectangular in cross section. They are disposed with the side of major dimension in slightly-spaced parallel relationship and insulated as are the terminal blocks 16, 17 by a thin layer of insulating material 22 such as mica or the like. These conductors are oftentime termed "fish tails" and extend upwardly within a short distance below the skelp A shown in this figure in dashed lines. The fish-tail conductors 20, 21 connect to a pair of conductors 23, 24 respectively, which extend in a horizontal opposite direction and parallel to the axis of the skelp A and in general proximity to the surface of the skelp opposite from the edges 10, 11. The ends of the conductors 23, 24 each connect to conductors 26, 27 extending vertically upward therefrom. These conductors may be generally in the form of rings with central openings 28, 29 in axial alignment through which the skelp A extends. The plane of the rings 26, 27 is transverse to the axis of the skelp A and the rings 26, 27 are attached or affixed eccentrically to the ends of the conductors 23, 24 do not extend across or interfere with the openings 28, 29. While the conductors 26, 27 are shown as O shaped, they may take any other desired geometrical shape either to correspond with the cross-sectional shape of the skelp or otherwise. Also, the shape of the inner opening need not be similar to the external shape of the conductor.

Diametrically opposite from the point of attachment of the conductors 23, 24 to the rings 26, 27, another conductor 30 is affixed to the opposed sides of the conductors 26, 27 and extends therebetween. Preferably, the lower surface of this conductor is flush with the upper inner surface of the conductors 26, 27. The conductor 30 in the embodiment of the invention shown in Figure 2 and in the embodiment of the invention shown in Figures 2 and 3 is the principal conductor opposite which the maximum amount of heating is to be performed. As it is desired to heat the edges 10 and 11 only, these edges are symmetrically positioned in reference to the conductor 30 and extend in parallel close-spaced relationship thereto.

In construction, the terminal blocks 16, 17, the fish-tail returns 20, 21 and the remaining conductors 23, 24; 26, 27 and 30 are all preferably rectangular in cross section and have a hollow interior, all of which hollow interiors are in continuous communication with hollow interiors of the terminal blocks 16, 17. Cooling water in the embodiment shown is fed through terminal block 16 through a suitable water connection 32, thence through the various conductors and out of the terminal block 17, through a suitable water connection 33. Obviously, other forms of cooling-water connections can be made inasmuch as the method of cooling the block forms no part of the present invention.

High-frequency electric currents are circulated through the inductor through the terminal blocks, the direction of current flow for any one instant being indicated by the arrows in Figure 2. In order to increase the concentration of the flux opposite the edges 10, 11, the conductor 30 is provided with a plurality of thin generally U-shaped laminations 35. These U-shaped laminations in the figures are mounted in inverted position and surround the conductor 30 on three sides. They are stacked along the conductor 30 so as to preferably extend the entire length thereof. The ends of the legs are preferably cut away as shown to provide increased flux concentration. Copper plates 36, 37 are provided at each end of the stack of laminataions to prevent actual contact of the laminations with the conductors 26, 27 and to shield the end laminations of the stack from the flux field of these last-mentioned conductors.

It will be noted that the conductor 30 is of a smaller cross-sectional area than the other conductors and, particularly, the conductors 23, 24. By such a construction, the current density in the conductor 30 is greater than the current density in the conductors 23, 24 and, thus, the flux density therealong is also greater. In addition, the laminations 35 serve to considerably reduce the reluctance of the magnetic circuit about the conductor 30 and, thus, provide an even greater concentration of flux lines.

The currents flowing in the diametrically opposite halves of each of the conductors 26, 27 are in the same direction from the respective lower conductor to the upper conductor 30, or vice versa. Thus, voltage gradients in a circumferential direction in the skelp A are cancelled out and very little, if any, high-frequency voltage will exist across the edges 10, 11 as a result of these conductors. As the cross-sectional area of the conductors 23, 24 is substantially greater than the conductor 30, the current density is, therefore, less and the flux field is, therefore, less, whereby currents induced in the skelp A caused by this flux field will be at a minimum. Also, any currents generated will flow over a substantial area such that a minimum of heating will occur.

As stated, the conductor 30 is intended to perform the principal heating action, although the conductors 23, 24 could also perform this function if the skelp were reoriented 180 degrees from the position shown in Figure 2. Preferably, the relative cross-sectional areas of the conductor 30 and conductors 23, 24 should be reversed.

The current-flow pattern induced in the skelp A by the inductor C is shown in greater detail in Figure 4. In Figure 4, the direction of the currents in the inductor at any one given instant is indicated by the dotted arrows. The currents induced to flow in the skelp A by this flow of current in the inductor C are indicated by the solid circular loops with arrowheads. It will, thus, be seen that the current flow to the left which is adjacent the edges 10, 11 is concentrated next to or immediately at or in the edges 10, 11, while the current flow to the right, which is the return current flow, is spread out a considerable area of the skelp. As the heat is substantially a function of the current density, it will be appreciated that the edges 10, 11 will become quickly heated, while the remaining portion of the skelp will be heated less, if at all. It will also be appreciated that because the flow of currents in the same direction in both halves of the conductors 26, 27, there will be little or no circumferential voltages induced in the skelp A. Also, it will be noted that the current in the edge 10 is in the same direction as the current in the edge 11 and of an equal magnitude. Therefore, the edges 10 and 11 may be brought into engagement without any fear of arcing between the edges due to a difference of electrical potential therebetween.

Figure 6:
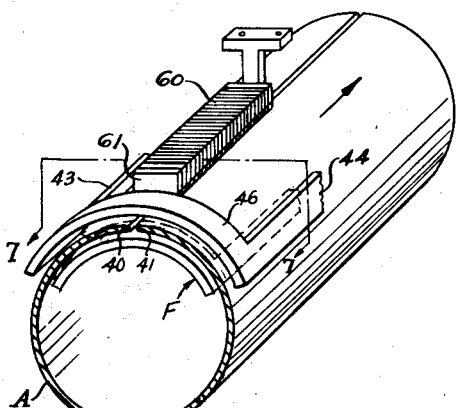
Figure 6 is an end elevational perspective view of the inductor shown in Figure 5.

Referring now to Figures 5 and 6, an inductor E is shown capable of carrying out the present invention and comprising, generally, three spaced parallel conductors 43, 44 and 45, the last-mentiond conductor being the central conductor of the three. The conductors 43, 44 and 45 are connected at their ends in an electrically parallel circuit by means of arcuate conductors 46, 47, the conductor 46 being positioned on the left-hand end of the conductors shown in Figure 5 and the conductor 47 being on the right-hand end. The conductor 45 is formed in two parts in aligned relationship with the adjacent ends in slightly-spaced and insulated relationship. Fish-tail leads 50, 51 extend generally perpendicularly from the conductor 45, one from each part and in insulated relationship for a short distance. Terminal blocks 52, 53 respectively are affixed to the end of these leads. These fish-tail blocks are adapted to support the inductor E and to provide an electrical connection for the inductor to a high-frequency power source 54. For the purposes of clarity, the leads are shown in spaced relationship. In actual practice, they would be in close-spaced relationship as is shown in Figure 1.

The various conductors just referred to are adapted to have high-frequency currents circulated therethrough, the direction of the current flowing at any one instant being indicated by the arrows in Figure 5. These currents are relatively high and it is preferred that the conductors be a hollow copper shell to provide continuous water passages whereby cooling water may be circulated through the interior thereof.

Each conductor is disposed in close-spaced, current-inducing relationship to the sides of the skelp. The induced currents on each side of the edge flow generally in a big rectangular loop corresponding to the rectangular loop formed by each side conductor 43, 44 and the central conductor 45, and the end conductors. Normally, the heating would be uniform under each conductor. To obtain maximum efficiency of heating, the currents adjacent the edges 10, 11 must be concentrated to produce a maximum of heating while the currents remote from the edges; i. e., in the opposite direction and transversely relative to the edges, must be relatively unconcentrated to produce a minimum of heating.

To concentrate the currents along the edges, the circumferential width of the conductor 45 is made as narrow as possible while, at the same time, still providing the desired current-inducing relationship.

For the purpose of further concentrating the heating effect only at the opposed edges, the conductor 45 is provided with magnetically-permeable material comprising, in the present embodiment, a plurality of inverted, U-shaped, thin, magnetic laminations 60 having their principal plane transverse of the length of the conductor 45. As shown, these laminations 60 cover both sides and top of the conductor 45, which are the sides away from the edges 10, 11. Preferably, the stack of laminations at each end; that is, adjacent the conductors 46, 47 and the fish-tails 50, 51, are terminated in inverted U-shaped copper laminations 61, the effect of which is to shield the magnetic laminations from the flux field about the fish-tail leads 20, 21 or the conductors 46, 47. The magnetically-permeable material is preferably artificially cooled. Thus, the copper laminations 61 may be brazed to the conductor 45, thus serving as a means of facilitating the cooling of the laminations 60. Other intermediate copper-cooling laminations brazed to the conductor could be provided. The laminations shown have the outer corners removed as at 55, thus narrowing the width of the surface of the laminations facing the skelp and providing a maximum concentration of the flux as it leaves the laminations to thread into the edges of the skelp.

The flux concentration in the laminations at this surface may be beyond the magnetic saturation point of the metal employed. Elsewhere, because of the increased width of the laminations, the flux concentration is less.

The spacing between the side conductors 43, 44 and the central conductor 45 should preferably be held to a minimum. As the side conductor is moved toward the central conductor, the length of the transverse current path relative to the edges and its resistance is lessened, thus reducing heating from the transverse currents. However, as the side conductors are moved closer to the main conductor, its flux then tends to thread through the laminations, heating them undesirably.

The side conductors have a relatively large circumferential width as shown in Figures 5 and 6 so as to distribute the induced currents over as wide a path or area as possible. The amount of heat developed under each conductor is in some ways inversely proportional to the width of the induced current path as the total electrical resistance is less for wider paths. The total current remains the same.

Figure 7:
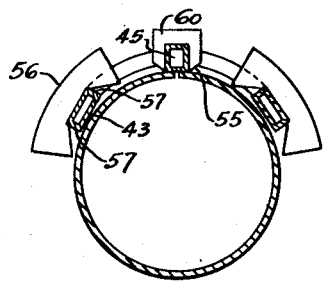
Figure 7 is an end sectional view of the inductor shown in Figure 5 showing a modification for increasing the electrical coupling of the outer conductors to the workpiece without substantially increasing the concentration of currents thereunder.

The side conductors may also be provided with magnetically-permeable material to reduce the reluctance of the magnetic circuit therearound, such as laminations 56 in Figure 7.

The laminations 56, however, are formed in the opposite manner to the laminations 60; that is, instead of concentrating the flux pattern into the workpiece, the laminations are so shaped as to spread the flux pattern out as much as possible. Thus, the area of the surface of the laminations facing the sides of the skelp is quite substantial. To prevent flux crowding at the inner corners 57 of the conductors 43, the reluctance of the flux path is increased adjacent the corners by cutting away the surfaces of the laminations as at 55 and providing a varying clearance between the surface of the laminations and the sides of the skelp. Ideally, the reluctance of the flux path should be constant over the entire width of the laminations.

All of the conductors are in as close current-inducing relationship to the skelp as possible without electrically contacting and an efficient electrical coupling results. It will be appreciated that each ampere of current in the skelp induced by the conductors 43, 44 is relatively spread out in the skelp remote from the edges but the return-current path therefor is crowded into the edges themselves, thus further increasing the heating action therealong.

Figure 8:
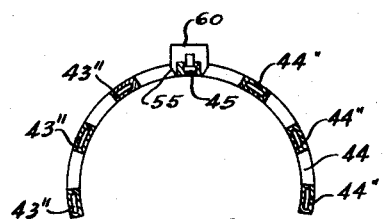
Figure 8 is an end sectional view of a further modified form of inductor taken as though on the line 7—7 of Figure 6.

Figure 8 shows a further modified construction for spreading out the return currents. Here, the side conductors are comprised of a plurality of spaced conductors 43", all connected in parallel by end conductors.

Figure 10:
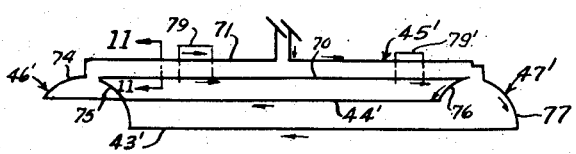
Figure 10 is a schematic view of a further alternative arrangement of an inductor showing all the conductors connected in electrical series.
Figure 11:
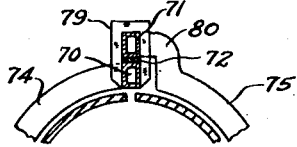
Figure 11 is a fragmentary sectional view of Figure 10 taken approximately on the line 11—11.

Alternatively, the inductor may have an electrical circuit such as that shown in Figure 10. Here, the central conductor 45' is actually comprised of two parallel-extending conductors 70, 71 which may be either side by side or as shown in Figure 11 with the conductor 71 on top of the conductor 70 with a layer of insulation 72 therebetween. In a like manner, the conductors 46' and 47' are discontinuous, the conductor 46', being formed in two parts 74, 75 and the conductor 47' being formed in two parts 76, 77. The conductors 43' and 44' are substantially as shown in the principal embodiment.

In the embodiment shown in Figure 10, the lower central conductor 70 connects at its left end to the end conductor 75 and at its opposite end to the end conductor 76 which, as will be noted from the figure, is on the opposite side of the main conductor to that of the conductor 74. In a like manner, the conductor 71 at its left end is connected to the end conductor 74 and its right end to the end conductor 77. Each of these end conductors are on opposite sides of the main conductor 45'. In this embodiment of the invention, laminations 79 shown schematically in Figure 10 of a U-shape extend over both of the conductors 70, 71, combining their magnetic field and restricting, to a large extent, any leakage flux between the conductors 70, 71. As shown clearly in the cross-sectional end view of Figure 11, the end conductor 75 has an offset 80 so that it may connect to the conductor 71.

Figure 12:
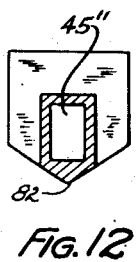
Figure 12 is a still further modified shape of the central conductor particularly adapted to increase the current-carrying capacity of the conductor.

Figure 12 shows a cross-sectional view of a modified central or main conductor 45'' having a pointed lower edge 82 to provide a further concentrated heating at the edges of the pipe.

Figure 9:
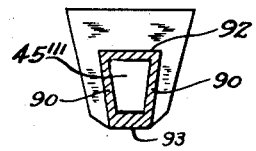
Figure 9 is a sectional view of a central conductor having a slightly modified cross-sectional shape.

Figure 9 shows a further modification of the main conductor 45''' which provides an extremely narrow heat band on the edges 10, 11 while, at the same time, being capable of carrying extremely high electric currents. In this embodiment, the inductor 45''' is formed in the shape of a trapezoid having parallel upper and lower walls 92, 93 and angularly-disposed side walls 90. The width of the lower wall 93 is substantially less than the width of the upper surface. However, the thickness of the lower wall 93 is made substantially greater than the wall thickness of the other walls to provide an increased current-carrying capacity along this surface. The main portion of this current concentrates in this surface because of the proximity effect. It will be appreciated that the other wall thicknesses could be increased to correspond to that of the lower surfaces; but, if this were done, the area of the cooling passage would be considerably reduced. The conductor 45''' shown in Figure 9 may be formed in any conventional manner, but, preferably, by machining the lower and two side walls from a piece of solid copper and, subsequently, brazing the upper wall 92 in place.

In operation, the central or main conductor is disposed in close, spaced, parallel relationship with the edges to be heated and high-frequency, high-density electric currents are flowed therethrough which, in turn, induces similar currents to flow in the edges. The currents at any one instant in both edges are in the same direction for the entire distance through the thickness of the metal, which means that the return-current flow must be elsewhere in the metal at a point remote from the edges partly because of the skin effect of high frequencies. The tendency of this current is to concentrate itself only at the extreme surface of the edge itself and a heating action in proportion to the amount of current results. As the currents induced are extremely high, the heating action is extremely high, the temperature change being on the order of 2300° F. in from .3 to one second. In this extremely limited period of time, there is very little opportunity for the heat to flow circumferentially outwardly away from the edges so that the heat is truly concentrated at the surface of the edges. Immediately upon the edges having reached the welding temperature, they are brought into preferably relatively light pressure engagement sufficient to hold the highly heated edges in welding engagement but without causing a sufficient plastic flow such that the highly heated metal is displaced from the welded area and the slightly colder metal backing up the edges comes into engagement. This metal, while possibly at a plastic heat, is not at the welding heat. It has been found that if too much pressure is applied, the welded section is not as strong as when a moderate amount of pressure is used. This process is in contradistinction to resistance welding where, as the metal reaches the plastic state, it is under rather extreme pressure and rupturing of the metal structure results even before the true welding temperature has been reached. As a result of the need for continued pressure in the resistance weld, a relatively large amount of the upset occurs and a breaking down of the grain structure of the metal at a point slightly remote from the welded area itself occurs. Accordingly the present method of welding permits of a smaller wastage of metal in the welding bead formed.

Referring to Figure 11, it will be seen that the edges of the skelp during the heating operation may be slightly divergent. The density of the flux field about the conductor decreases in proportion to the distance away from the conductor. Thus, the amount of induced currents on the inner corner of the edge of the skelp will be slightly less than the current in the outer corner of the edge of the skelp. With this phenomena existing, the inner corner is heated to a slightly less amount than the outer corner. Thus, if the edges are brought into pressure-welding engagement, the tendency for the plastic metal at the edges is to flow radially outwardly forming a bead only on the outside of the pipe itself, which bead can there be readily controlled as desired. If the bead were formed on the inside, controlling it or machining it becomes an extremely expensive problem.

With the inductor shown and method described, quite satisfactory and complete homogeneous welds have been obtained on one-inch pipe having a wall thickness of .029 inch and using 130 kw. of 10,000 cycles per second electric power and a pipe speed on the order of 60 to 100 feet per minute. The resultant welded bead is small and well rounded. It has no jagged edges. There are no scale inclusions, a partial explanation of which may be attributed to the fact that the very rapid heating effect expels the scale in a manner as taught in the patent to Strickland, No. 2,425,134, dated August 5, 1947.

The invention and embodiments shown are susceptible to many modifications; e. g., the inductors and method shown may also be used for heating the opposed edges of flat plates, in which case the end conductors 46, 47 of Figure 5 would be substantially straight. The inductors of Figure 5 may also be used for heating the base of long grooves or the like, in which case the end conductors would be curved in the opposite direction; i. e., gull winged. If hardening by quenching is to be obtained, the inductor may be provided with integral spray-quench holes whereby a quench medium can be sprayed directly onto the heated surface. The inductor may be moved while the work remains stationary.

Inductors of the type shown in the copending application of Alfred C. Body and James W. Williamson, Serial No. 146,888 filed February 28, 1950, may also be employed with success to carry out the present method.

When the thickness of the material adjacent the edges is such that full penetration of the high-frequency flux through the entire thickness of the metal cannot be obtained, a second auxiliary inductor F similar to the inductor described, but inverted may be employed and positioned on the other side of the edge which, in the case of skelp, would be on the interior of the skelp and, in the case of flat plates, would be on the opposite sides of the flat plate from the principal inductor. In either event, the current in the principal or main conductor of this second inductor should be, at any one instant, in the same direction as the current in the main conductor of the principal inductor. Thus, the current flowing in the abutting edges will always be in the same direction over the entire width of the edge itself, preventing dead or neutral spots of current along the edge itself.

Claims directed to the inductor per se of Figures 5–12 will be found in my copending patent application Serial No. 184,745 filed September 14, 1950, which is a division of application Serial No. 86,066 filed April 7, 1949, now abandoned.

It is intended to use the term "skelp" throughout this specification in its broader connotation, including metallic strip formed into a substantial C shape by either hot or cold workpiece processes.

It will be appreciated that other modifications will occur to others upon a reading and understanding of this specification. It is my intention to include all such modifications as part of my invention insofar as they come within the scope of the appended claims.

Having thus described my invention, I claim:

1. The method of welding skelp providing skelp having a substantially C-shaped cross section and opposed edges to be welded, progressively inducing high-frequency currents to flow in the plane of the surface of the skelp with the direction of the currents transversely through the skelp at any given point all being in the same direction, and with the currents in one direction at the opposed edges being highly concentrated and the currents in the other direction remote from the edges being relatively unconcentrated, whereby to progressively heat said edges principally and, subsequently, while said edges are heated, progressively bringing said edges into pressure-welding engagement.

2. The method of heating a pair of opposed edges of substantially C-shaped skelp prior to welding same comprising providing a substantially C-shaped skelp having a pair of opposed edges to be welded, inducing high-frequency currents to flow in the wall of said skelp with the direction of current flow through the wall at any given point being all in the same direction, the currents immediately adjacent the edges being highly concentrated while the currents remote from the edges are relatively unconcentrated, whereby to principally heat the opposed edges.

3. The method of heating a pair of narrow elongated, close-spaced edge portions on generally cylindrical bodies comprising providing a generally cylindrical body having a pair of narrow, close-spaced edge portions to be welded, providing a pair of elongated high-frequency flux fields having spaced parallel axes but rotating in opposite directions and one of said flux fields having a much greater concentration than the other, threading said concentrated flux field through said portions and threading the unconcentrated flux field through other portions of said member, whereby to concentrate the flow of currents induced by said concentrated flux field and dispersing the return flow of current therefrom with the unconcentrated flux field.

4. The method of continuously welding tubing comprising providing a longitudinally split tube having a pair of edges in slightly spaced relationship; continuously moving said tube along a line of movement parallel to said split; continuously inducing high-frequency currents to flow in the walls of the tube; the direction of the currents at any given point transversely through the wall all being in the same direction; the currents in the opposed edges being in the same direction and very highly concentrated and the currents in the other direction remote from the edges being relatively unconcentrated whereby to continuously heat said edges principally; continuing said induced current flow until said edges approach the pressure-welding temperature and, continuously, as said edges are heated to said temperature, bringing said edges into pressure-welding engagement.

5. The method of heating a pair of opposed edges of substantially C-shaped skelp prior to welding same comprising providing a longitudinally split tube having a pair of edges in slightly spaced relationship; moving said tube continuously along the line of movement parallel to said split; continuously inducing high-frequency currents to flow in the walls of said tube with the direction of current flow through the wall at any given point being all in the same direction; the currents immediately adjacent the edges being very highly concentrated while the currents remote from the edges are relatively unconcentrated whereby to principally continuously heat the opposed edges to a pressure-welding temperature.

6. The method of heating a pair of narrow elongated close-spaced edge portions on generally cylindrical bodies preparatory to welding same comprising providing a longitudinally split tube having a pair of edges in slightly spaced relationship; moving said tube continuously along a line of movement parallel to said split; providing a pair of elongated high-frequency flux fields having a greater concentration than the other by a factor of more than two times; threading said concentrated flux field through said edges whereby to provide a highly concentrated flow of currents immediately adjacent the edges to rapidly heat same and allowing the return currents to be substantially unconcentrated whereby to provide a minimum of heating in the walls of the tube remote from the edges.

7. A method of manufacturing long lengths of tubing comprising providing an elongated length of flat metallic strip; progressively forming said strip into a C-shaped tube with the longitudinal edges thereof in generally abutting relationship; progressively moving said strip under a high-frequency inductor; inducing high-frequency currents to flow in the walls of said tube with the currents immediately adjacent the edges very highly concentrated and the currents remote from the edges being relatively unconcentrated and with the currents at any point through the thickness of the walls of said tube being always in the same direction at any one instant and the current in the edges at any one instant always being in the same direction whereby to progressively and very rapidly heat said edges only to a pressure-welding temperature and, after said edges are heated, progressively bringing said edges into pressure-welding engagement.

8. The method of pressure welding a pair of elongated metallic edges of generally thin metallic material comprising disposing said edges in close-spaced parallel relationship; providing a high-frequency inductor having a main conductor in close-spaced parallel relationship to said edges; progressively moving said edges relative to said inductor and inducing high-frequency currents to flow in said material with the current through the thickness of the material at any one point being always in the same direction at any one instant and the currents immediately adjacent said edges being very highly concentrated and the return currents remote from said edges being relatively unconcentrated to progressively and very rapidly heat said edges to the pressure-welding temperature and, after said edges are heated, progressively bringing said edges into pressure-welding engagement.

9. The method of heating and welding the opposed edges of continuously-moving skelp, said edges having inner and outer corners, comprising disposing said edges so as to be slightly spaced and slightly divergent radially outwardly, heating said edges to a slightly greater extent on the outer corners thereof than on the inner corners to a temperature substantially above the temperature where plasticity first occurs but below the fusion temperature and bringing said edges into pressure engagement.

10. A combination of claim 9 wherein said edges are heated by high-frequency currents induced to flow by a high-frequency flux field, decreasing in density from the outer to the inner corner.

11. The method of welding elongated opposed edges of continuously-moving elongated metallic articles comprising disposing a high-frequency inductor having an inducing conductor in proximity to the article with the conductor in parallel and close-spaced relationship with the edges, flowing high-frequency currents in said conductor to induce currents to flow in a highly concentrated form longitudinally of and only in said edges to heat same, the current at any one instant flowing in both of said edges in the same direction, flowing said current until said edges are substantially above the plastic temperature approaching the fusion temperautre, and lightly abutting said edges to weld same and holding said edges in abutment until the welded portion has cooled below the plastic temperature.

12. The method of welding elongated opposed edges of metallic articles comprising disposing a pair of high-frequency inductors, each having an inducing conductor in proximity to the article, with the conductors in parallel and close-spaced relationship with the edges and on opposite sides thereof, flowing high-frequency currents in said conductors in the same direction to induce currents to flow longitudinally of said edges to heat same, flowing said currents until said edges are substantially above the plastic temperature approaching the fusion temperature and lightly abutting said edges to weld same.

13. In the art of heating the opposed edges only of a skelp to a pressure-welding temperature, a pair of high-frequency inductors adapted to be disposed, one externally of and the other internally of, said skelp, each of said inductors including an elongated conductor adapted to be disposed in close-spaced parallel relationship with the edges of said skelp to be heated, and means for supplying high-frequency electric currents to said conductors so that the current in both of said conductors will be, at any one instant, flowing in the same direction, and means for moving said skelp relative to said conductors in a direction so that the edges move lengthwise of the conductors.

14. The method of welding elongated opposed edges of continuously moving elongated metallic articles comprising disposing a high-frequency inductor having an inducing conductor in proximity to the article with the conductor in parallel and close-spaced relationship with the edges, disposing a narrow band of material of high magnetic permeability on at least each side of said conductor and in close-spaced relationship with the article adjacent said edges, flowing high-frequency currents in said conductor to create a high-frequency flux field thereabout, said high-frequency flux field being confined by and threading through said magnetic material and said edges to induce high-frequency currents to flow longitudinally of said edges to heat same, the current in any one instant flowing in both of said edges in the same direction, flowing said current until said edges are substantially above the plastic temperature approaching the fusion temperature and abutting said edges to weld same.

15. The method of welding elongated opposed edges of continuously moving elongated metal articles comprising disposing a high-frequency inductor having an inducing conductor in proximity to the article with the conductor in parallel and close-spaced relationship with the edges, flowing high-frequency currents in said conductor to generate a high-frequency flux field about said conductor and threading through said edges, concentrating said flux field about the sides of said conductor, whereby to induce extremely concentrated high-frequency currents to flow longitudinally of said edges to heat the same, the current at any one instant flowing in both of said edges in the same direction, flowing said current so that said edges are above the plastic temperature approaching the fusion temperature and abutting said edges to weld same.

16. In combination, a pair of high-frequency inductors adapted to heat the opposed edges of a C-shaped metallic tube prior to the welding of said edges, one of said inductors being adapted to be disposed externally of said tube and the other of said inductors being adapted to be disposed internally of said tube, each of said inductors including an elongated main heating conductor disposed in close-spaced parallel relationship to said edges and means for energizing said conductors from a source of high-frequency electrical energy so that the current in said conductors at any one instant is always flowing in the same direction.

PHILLIPS NIELSEN SORENSEN.

No references cited.